Patented Apr. 19, 1938

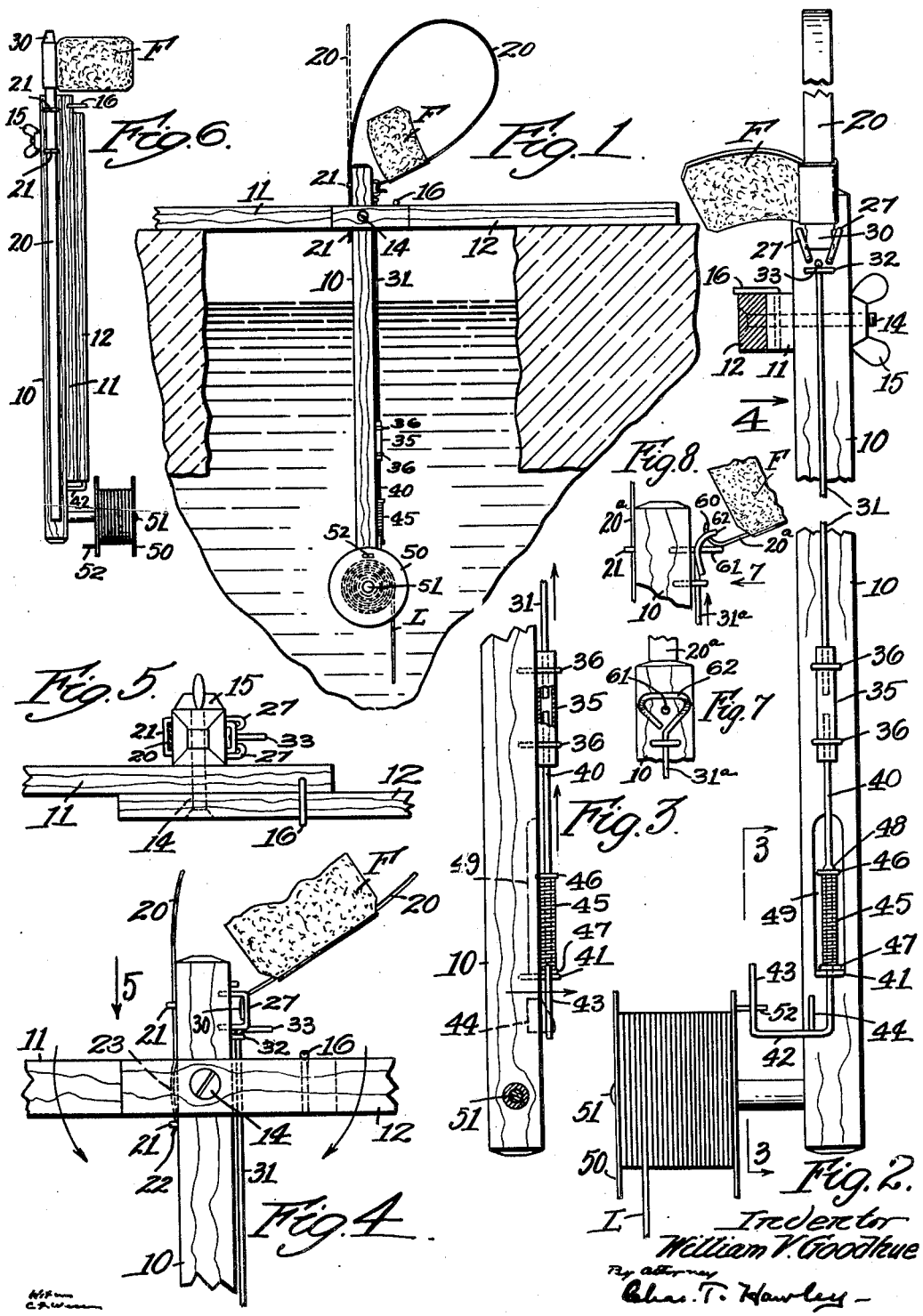

2,114,529

UNITED STATES PATENT OFFICE 2,114,529

TILT FOR ICE FISHING

William Velte Goodhue, Leominster, Mass.

Application February 12, 1937, Serial No. 125,518

8 Claims. (Cl. 43—16)

This invention relates to a tilt for use in fishing through ice. It is customary in such fishing to set a number of lines in separate holes through the ice, and to provide a flag for each line which is raised or released by the pull of a fish on the line, thus attracting the attention of the fisherman.

If the line extends above the surface of the water it will freeze in the skim of new ice which forms quickly in a fishing hole on a cold day. When the line is so frozen, the flag will not be released by the ordinary initial pull of a fish.

It is the general object of my invention to provide an improved construction of tilt so designed that freezing of the water surface will not interfere with effective release and operation of the signal device.

To the attainment of this object I provide a signal release member extending substantially below the surface of the water and I provide means to operate said signal release member with a sharp or hammer-like blow, so that the release member is instantly freed from any ice which may have formed about said member and immediately releases the signal or flag.

Another object of my invention is to provide a tilt which is so constructed that it is exceptionally convenient for packing or transportation.

My invention further relates to arrangements and combinations of parts which will be hereinafter described and more particularly pointed out in the appended claims.

A preferred form of the invention is shown in the drawing, in which

Fig. 1 is a side elevation of my improved tilt in operative position;

Fig. 2 is an enlarged front elevation thereof, looking from the right in Fig. 1;

Fig. 3 is a partial sectional side elevation, taken along the line 3—3 in Fig. 2;

Fig. 4 is an enlarged side elevation of certain parts shown in Fig. 1;

Fig. 5 is a detail plan view, looking in the direction of the arrow 5 in Fig. 4;

Fig. 6 is a view of the tilt when folded for transportation;

Fig. 7 is a detail front elevation of a modified construction; and

Fig. 8 is a side elevation thereof.

Referring to the drawing, my improved tilt comprises an upright support 10 having cross arms 11 and 12 pivoted thereto by a clamping screw 14 which extends through the cross arms and support and is provided with a wing nut 15 at its threaded end. A stop in the form of a wire 16 is secured in the cross arm 11 and the upper end of the wire 16 is bent laterally to overlie the cross arm 12 when the arms are in operative position.

When the tilt is in storage or is to be transported, the cross arms 11 and 12 occupy the folded position indicated in Fig. 6, but when the tilt is to be used, the arms are swung outward in opposite directions to the horizontal position shown in Figs. 1 and 4, and are aligned by the stop wire 16.

A flat steel spring 20 is slidable in staples 21 on the upright support 10, and a flag F is secured to the upper end of said spring. When the tilt is to be transported, the spring may be slipped downward through the staples 21 to the folded position shown in Fig. 6, but when the device is in use, the spring is pulled upward through the staples 21 to the position shown in Figs. 1 and 4.

The upward movement of the spring 20 is limited by engagement of its offset lower end 22 with the lower staple 21. The spring is held yieldingly in upper position by a slight hump or offset portion 23 (Fig. 4) in the spring near the lower end.

A pair of staples 27 are mounted in oppositely inclined positions near the top of the support 10, as shown in Figs. 1 and 4, and these staples are spaced apart to receive the offset and slightly reduced end 30 of the spring 20.

A signal release member 31 in the form of a rod is mounted at the front of the support 10 and is loosely confined and guided at its upper end by a staple 32. The offset upper end portion 33 of the member 31 is positioned between the spring-holding staples 27 and underlies the end 30 of the spring 20 when the parts are in the position shown in Figs. 1, 2 and 4. The lower end of the member 31 is slidable in a sleeve or bushing 35 which is fixed to the side of the support 10 by staples 36.

An actuating member 40 is mounted on the lower part of the support 10 and is in the form of a rod having an upright portion, the upper end of which is slidable in the lower part of the sleeve or bushing 35 previously described. The lower part of the upright portion is slidable through a staple 41 in the post 10.

At its lower end the member 40 is offset laterally as indicated at 42 and is up-turned as indicated at 43. The portion 42 normally underlies a catch 44 fixed in the support 10.

A coil spring 45 is mounted on the member 40 between collars 46 and 47. The upper collar 46 is held from upward movement on the member 40 by an enlargement 48 of the rod, and the lower collar 47 rests loosely on the staple 41. The spring 45 thus tends to slide the actuating member or rod 40 upward when the latter is released from the catch 44. A shallow recess 49 is preferably formed in the side of the support 10 to provide clearance for the spring 45 and collars 46 and 47.

The ends of the members 31 and 40 are spaced apart in the sleeve 35 when the actuating member is held down by the catch 44. The spring 45 at this time is strongly compressed.

When released, the actuating member 40 moves upward very abruptly and strikes a substantial blow on the lower end of the release member or rod 31, which blow will release the small rod from any ice which may have formed at the surface of the water.

After striking the blow, the actuating member continues to force the member 31 upward by spring pressure and causes it to engage the offset end 30 of the spring 20, disengaging and releasing the same from the staples 27. The spring 20 then straightens to the position indicated in dotted lines in Fig. 1, thus raising the flag and giving the desired signal.

The fish line L is mounted on a reel 50 pivoted on a stud 51 secured in the lower end of the support 10 and freely rotatable thereon. A pin 52 projects from one side of the reel 50 in position to engage the upward extension 43 of the actuating member 40 when the reel is rotated by the pull of a fish.

Such engagement swings the actuating member free of the catch 44, after which it moves quickly upward, striking a hammer blow on the lower end of the release member or rod 31, and releasing the spring 20, all as previously described.

The staple 41 is rather wide, so that the lower end of the actuating member may be shifted sideways toward or away from the catch 44. The leverage of the actuating part 42 may thus be adjusted by shifting the rod 40 laterally in the staple 41 when setting the tilt, thus varying the pull necessary to release the member 40 from the catch 44.

In Figs. 7 and 8 I have shown a modified construction for retaining and releasing the signal spring and flag. In this construction, the free end of the spring 20ª is offset and curved upward as shown in Fig. 8 to provide a hook end 60, and the upright support 10 is provided with a pin or stud 61 which forms a rest for the free end of the spring 20ª when the tilt is set. The release rod 31ª is bent to form an offset loop 62 as shown in Figs. 7 and 8, which loop encircles the pin 61. The straight upper end of the loop 62 is drawn down over the hook end 60 of the signal spring when the tilt is set, and normally retains the parts in the position indicated in Fig. 8 until the release member 31ª is freed and moves upward as previously described. Such upward movement will lift the loop 62 above the hook end 60, thus allowing the hook end to move to the right in Fig. 8 to clear the pin 61, after which it snaps to upright position as previously described. This modified construction possesses certain advantages over the construction previously described and is more economical to manufacture.

It will be noted that the reel and line is at all times entirely submerged, so that the line cannot be confined by ice forming at the surface of the water. The only moving part extending through this new ice is the release rod 31 which is of comparatively small cross section and which is effectively freed from the ice by the sharp hammer-like blow by which it is actuated.

Having thus described my invention and the advantages thereof, I do not wish to be limited to the details herein disclosed, otherwise than as set forth in the claims, but what I claim is:—

1. In a fishing tilt, a spring-actuated signal device, means to hold said device under tension, a release member for said device, an actuating member for said release member, a fish-actuated device to release said actuating member, and a spring to cause said actuating member to strike said release member a sharp blow when said actuating member is released.

2. In a fishing tilt, a spring-actuated signal device, means to hold said device under tension, a release member for said device, an actuating member for said release member, the adjacent ends of said two members being substantially spaced apart when the tilt is set, a fish-actuated device to release said actuating member, and a spring to cause said actuating member to strike said release member a sharp blow when said actuating member is released.

3. In a fishing tilt, a spring-actuated signal device, means to hold said device under tension, a slidable release member for said device, an actuating member for said release member, a catch to hold said actuating member under tension, a fish-actuated device to release said actuating member, and a spring for said actuating member effective to cause said actuating member to strike said release member a sharp blow longitudinally thereof when said actuating member is released from said catch.

4. In a fishing tilt, an upright support, a flat signal spring, means to secure one end of said spring to the upper end of said support, devices to temporarily secure the other end of said spring under tension to said support, a release member movably mounted on said support, and hammer means to move said release member abruptly to release said spring end from said temporary securing devices.

5. In a fishing tilt, a signal spring, an upright support for said spring, means on said support to retain the free end of said spring under tension, a release member slidably mounted on said support and positioned to engage and release said free end, an actuating member also slidably mounted on said support and positioned to engage said release member, a spring to move said actuating member upward, a catch for said actuating member, and a fish-actuated device to release said actuating member from said catch.

6. In a fishing tilt, a signal spring, an upright support for said spring, means on said support to retain the free end of said spring under tension, a release member slidably mounted on said support and positioned to engage and release said free end, an actuating member also slidably mounted on said support and positioned to engage said release member, a spring to move said actuating member upward, a catch for said actuating member, and a fish-actuated device to release said actuating member from said catch, said release member and said actuating member being substantially separated when the tilt is set, and said actuating member engaging said release member with a sharp blow when the tilt is tripped.

7. In a fishing tilt, an upright member, a pair of supporting cross arms, a single device to pivot and clamp adjacent ends of said cross arms to the upper end of said upright member, and a stop to hold said cross arms in substantial alignment with each other when in supporting position thereby providing a cross arm structure which may be angularly adjusted and clamped as a unit on said upright member.

8. In a fishing tilt, an upright member, a signal spring secured at one end to said upright member and having its free end offset and upcurved to form a hook, a pin in said support which provides a rest for said free hook end, a holding and release member for said hook end, said member having a loop to receive said end, and means to hold said release member and loop from upward sliding movement until said member is released by the pull of a fish on the line associated with the tilt.

WILLIAM VELTE GOODHUE.